United States Patent [19]
Cheng et al.

[11] Patent Number: 6,012,070
[45] Date of Patent: Jan. 4, 2000

[54] DIGITAL DESIGN STATION PROCEDURE

[75] Inventors: Mai-Ing L. Cheng, Williamsville; Paul Coniglio, Buffalo; Donna Yarwood, Amherst; Larry Chism, Grand Island, all of N.Y.

[73] Assignee: Moore Business Forms, Inc., Grand Island, N.Y.

[21] Appl. No.: 08/749,641

[22] Filed: Nov. 15, 1996

[51] Int. Cl.⁷ .................................. G06K 9/20
[52] U.S. Cl. ............................................ 707/505
[58] Field of Search .................... 707/505, 506, 707/501, 513, 514, 517

[56] References Cited

U.S. PATENT DOCUMENTS

| | | | |
|---|---|---|---|
| 4,437,122 | 3/1984 | Walsh et al. | 358/166 |
| 4,730,252 | 3/1988 | Bradshaw | 364/403 |
| 5,029,099 | 7/1991 | Goodman | 364/479 |
| 5,038,293 | 8/1991 | Goodman | 364/479 |
| 5,132,915 | 7/1992 | Goodman | 364/479 |
| 5,144,693 | 9/1992 | Morgan | 395/158 |
| 5,148,520 | 9/1992 | Morgan | 395/148 |
| 5,241,464 | 8/1993 | Greulich et al. | 364/401 |
| 5,251,291 | 10/1993 | Malcolm | 395/146 |
| 5,263,132 | 11/1993 | Parker et al. | 395/146 |
| 5,379,373 | 1/1995 | Hayashi et al. | 395/148 |
| 5,398,183 | 3/1995 | Elliott | 364/413.06 |
| 5,428,694 | 6/1995 | Betts et al. | 382/317 |
| 5,442,567 | 8/1995 | Small | 364/479 |
| 5,452,094 | 9/1995 | Ebner | 358/296 |
| 5,490,243 | 2/1996 | Millman et al. | 395/148 |
| 5,555,101 | 9/1996 | Larson et al. | 358/403 |
| 5,696,845 | 12/1997 | Loce et al. | 382/254 |
| 5,734,915 | 3/1998 | Roewer | 395/773 |

*Primary Examiner*—Joseph H. Feild
*Assistant Examiner*—Alford W. Kindred
*Attorney, Agent, or Firm*—Nixon & Vanderhye

[57] ABSTRACT

A customized business form or brochure having high resolution color graphics may be created by an end user without layout experience at a computer terminal at a user site to provide a customized business form or brochure in electronic format. Low resolution graphics templates (as well as textual templates) are provided at the user station to facilitate production of the customized business form and brochure and once the created document in electronic format is saved at the user station it may be electronically or otherwise transmitted to a printing installation without the necessity of transmitting a final document with high resolution color graphics in physical form. At the printing installation a physical copy (e.g. paper copy) of the business form or brochure is imaged (e.g. with a printing press or using ion deposition or other non-impact imaging techniques) with high resolution color graphics. Multiple customized business forms or brochures may be collected from a plurality of user stations and transmitted collectively to the printing installation, and multiple and distinct graphic depictions may be provided on the same document page.

20 Claims, 16 Drawing Sheets

OUT BOX

| ORDER ID | DATE | TIME | PO# | TEMPLATE | DESCRIPTION |
|---|---|---|---|---|---|
| 0386500095476 | 8/17/95 | 8:05:00 PM | 88566-95 | SODA #1 | SHELFTALKER STYLE 1 |
| 0386500085476 | 8/17/95 | 6:01:00 PM | 66774-95 | CAAQ | CHILL AISLE WITH |
| 0386500075476 | 8/17/95 | 4:39:00 PM | 39059-95 | CAAQ | CHILL AISLE WITH |
| 0386500065476 | 8/17/95 | 4:25:00 PM | 7556-95 | CAAQ | CHILL AISLE WITH |
| 0386500055476 | 8/17/95 | 4:23:00 PM | 7769-95 | CAAQ | CHILL AISLE WITH |
| 0386500045476 | 8/17/95 | 4:13:00 PM | | CAAS | SHELFTALKER STYLE 1 |
| 0386500035476 | 8/17/95 | 4:02:00 PM | | SODA #1 | SHELFTALKER STYLE 1 |
| 0386500025476 | 8/17/95 | 3:53:00 PM | | SODA #1 | SHELFTALKER STYLE 1 |
| 0386500015476 | 8/17/95 | 11:47:00 | | CAAQ | CHILL AISLE WITH |
| 0386500005476 | 8/17/95 | 11:15:00 | | | |

POSITION MOUSE IN FAR LEFT COLUMN AND PRESS LEFT MOUSE BUTTON TO SELECT ORDERS

- SELECT ALL ORDERS
- CLEAR ALL SELECTIONS
- PREPARE FOR XMIT
- COPY TO DISKETTE
- DELETE ORDERS
- CANCEL

FIG. 11

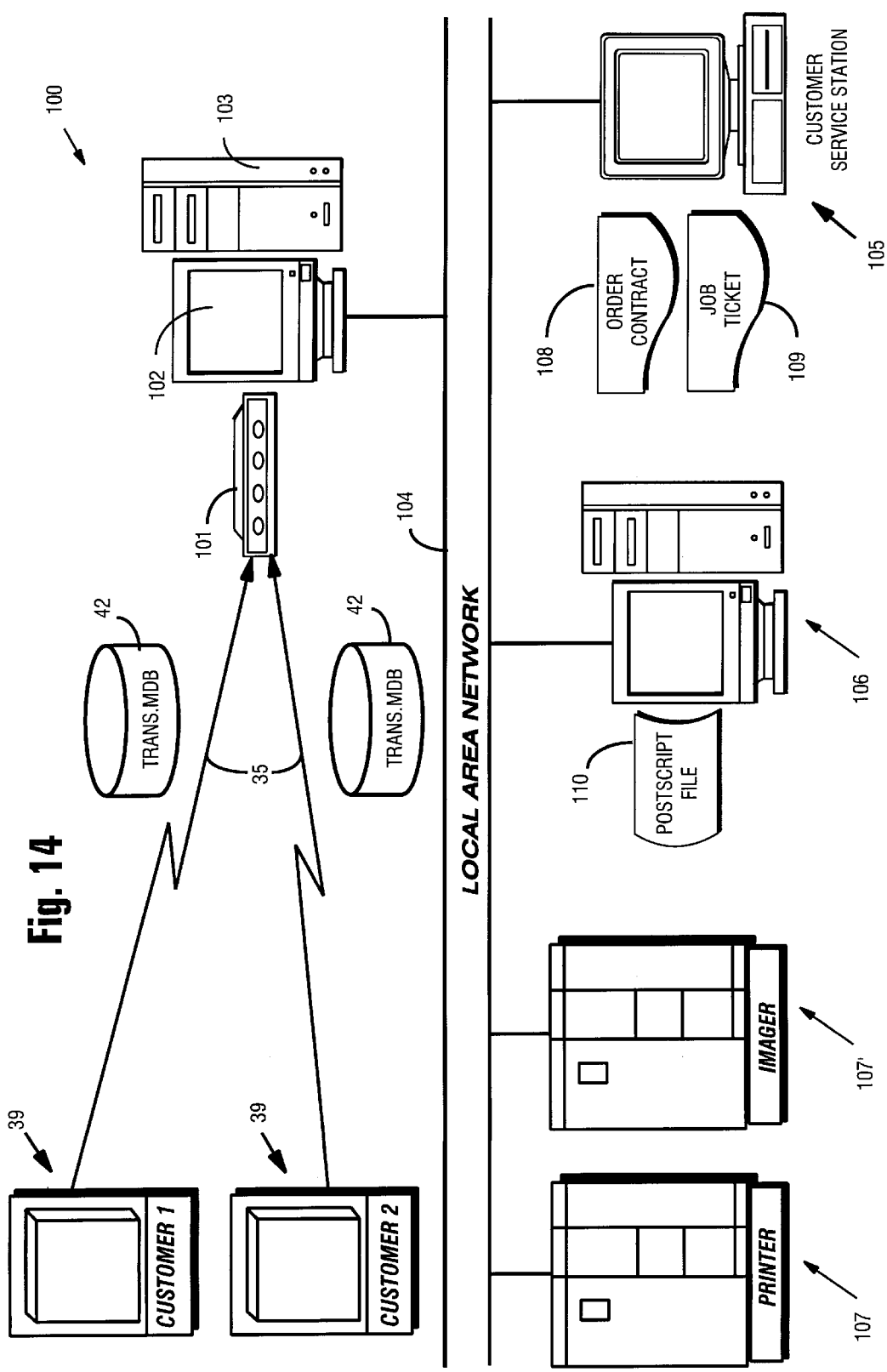

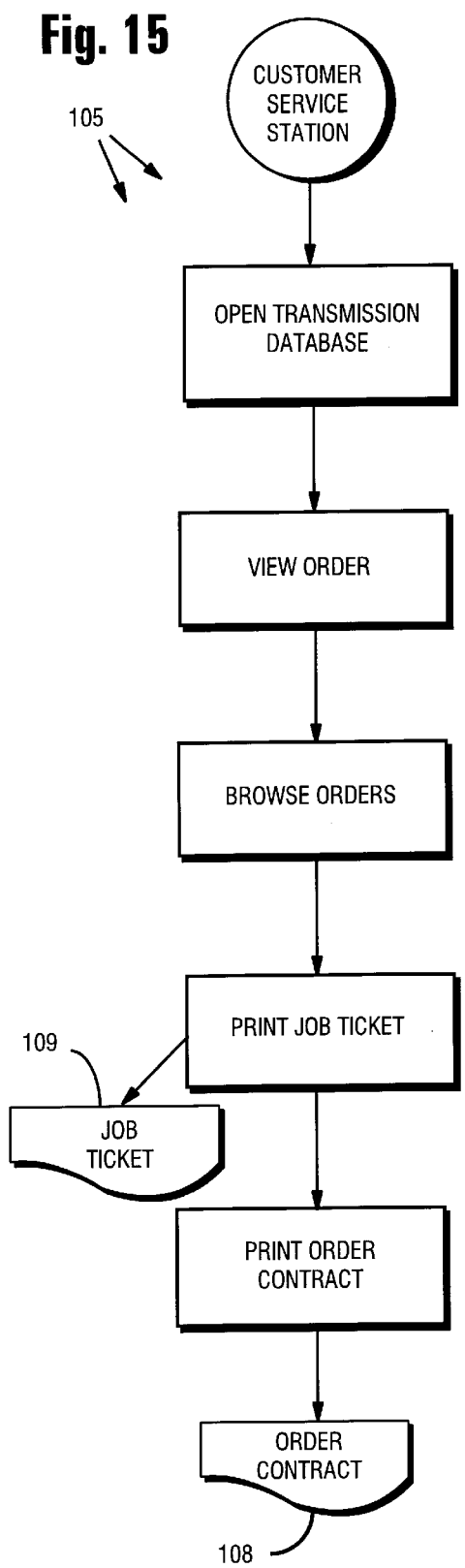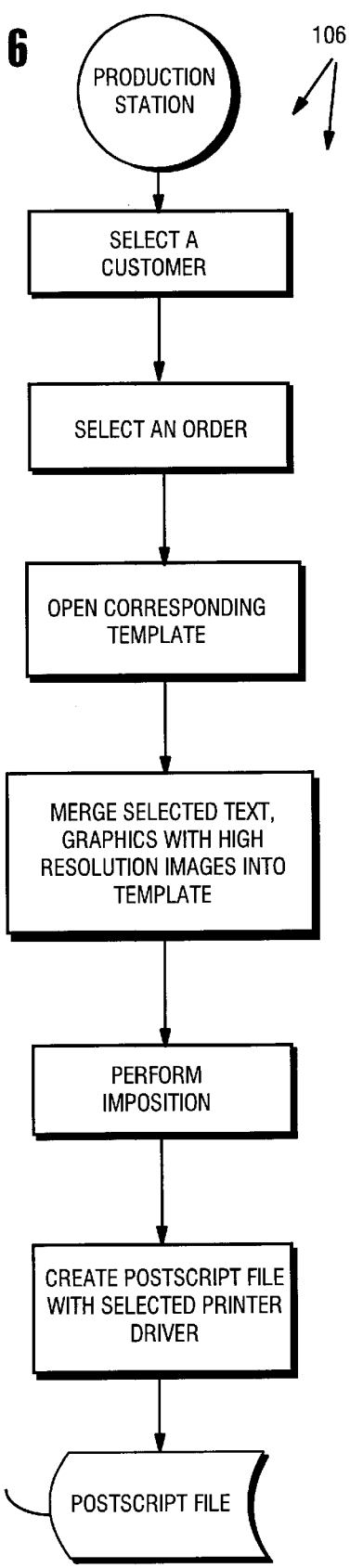

DIGITAL DESIGN STATION PROCEDURE

BACKGROUND AND SUMMARY OF THE INVENTION

Normally customized business forms and brochures having high resolution color graphics are produced by individuals with layout experience who compose the basic documents and then ship the final document, with high resolution graphics, to a printing facility where multiple copies of the business form or brochure are imaged either using a printing press, or various types of ion deposition or like non-impact printing techniques. This can be a difficult and time consuming process for the individuals creating the brochures or business forms, there can be significant delays as a result of transmission (typically shipment by courier service) of the documents from the creator to the printing facility, and integration of order information with the documents to be produced at the printing facility is not optimized.

According to the present invention a method of producing customized business forms or brochures having high resolution color graphics is provided which is greatly simplified compared to prior art procedures, both at the user station, and at the printing facility. According to the present invention an end user, without layout experience, by using a plurality of design graphic templates of low resolution can replace text, choose low resolution pictures from the graphic templates, and can quickly create customized, quality documents at the end user's convenience. The documents (customized business forms or brochures) in electronic format may then be readily transported (e.g. electronically over phone lines) to a printing facility where physical documents can be automatically created with quick turn around full process color high resolution printing. According to the present invention the entire work flow process from composition to order entry to production at the printing facility may be automated. Composition and order entry are tightly integrated together and customer information is seamlessly integrated into the production work flow. Documents are automatically recreated at the printing facility without requiring the creator to transmit the final document, high resolution graphics, and templates. Also, automation is provided at the printing facility to provide quick turn around full color process printing.

That is the Digital Design Station (DDS) according to the invention automates the composition and manufacture of corporate and commercial documents. It provides inexperienced users with the is ability to dynamically create and modify templated documents. DDS may be made up of five integrated systems: DDS Setup; DDS User, DDS Administration, DDS Order and DDS Production. DDS works in conjunction with commercially available off the shelf composition software, such as Adobe PageMaker and a relational database.

In the following description of the invention, in the specification and claims, the following definitions are used:

"Generic Template": A general-purpose template for any type of document, such as a business form, brochure, or sign. When the user replaces texts and graphics in a generic template, a customized document is created.

"High resolution" with respect to graphics/images: The fineness or coarseness as digitized, measured as dots-per-inch, always over about 100 dots-per-inch and typically 200–800 dots-per-inch, but dependent somewhat on the print device.

"Imposition": In the graphic arts, laying out pages in a press form or flat so they will be in the correct order after the printed sheet is folded.

"Low resolution" with respect to graphics/images: The fineness or coarseness as digitized, measured as dots-per-inch, always under 90 dots-per-inch and typically about 17 dots-per-inch, but dependent somewhat on the display device.

"Postscript": A software published by Adobe Systems that translates graphics created in a computer to language a (Postscript-compatible) printer can understand.[a page description language] Postscript-compatible printers have interpreters in them that create the proper dot patterns to recreate the screen image—text and graphics—to a page of paper.

"Preflight": The process of gathering all images, fonts and specifications necessary to print any document. This also includes correctly preparing the document for printing.

"Prepress": All printing operations prior to presswork, including design and layout, typesetting/imagesetting, graphic arts photography, color separation, image assembly, and platemaking.

According to one aspect of the present invention a method of producing customized business forms or brochures using a plurality of low resolution graphics templates in electronic form, and a plurality of text templates, using a user station including a video monitor, selection device (such as a keyboard and/or a mouse), and processor (typically in a PC or other computer equipment), is provided. The method comprises the steps of: (a) At the user station using the selection device to control the processor, selecting one or more low resolution graphics templates in electronic form from the plurality of templates, and displaying graphics corresponding to the graphic templates selected on the video monitor. (b) Using the selection device selecting text related to the graphics selected from the text templates, and displaying the text corresponding to the text template or templates selected on the video monitor with the selected graphics to provide a customized business form or brochure in electronic format. (c) Using the selection device and processor electronically saving the customized business form or brochure in electronic format. (d) Transmitting the saved customized business form or brochure in electronic format to a printing installation without transmitting a document, physical graphics, or templates from the user station. And (e) at the printing installation imaging a physical copy (e.g. paper) of the customized business form or brochure in electronic format transmitted in step (d), the customized business form or brochure in physical form having high resolution graphics corresponding to the template graphics selected in step (a).

Step (d) may be practiced by using the selection device to electronically transmit a customized business form or brochure in electronic format, e.g. over phone lines. Alternatively, step (c) may be practiced to save via electronic format onto a disk, and step (d) may be transmitted by physically transmitting the disk which—though it requires a courier services or other some other physical transporting procedure—is still simpler than prior art procedure which requires transmission of high resolution graphics "final" type documents. Other transmitting techniques that are conventional and suitable may also be utilized.

The method typically comprises the further steps, between steps (c) and (d), e.g. at an administration station, of collecting multiple customized business forms or brochures in electronic format from a plurality of different user stations, and assigning identifying indicia to each; and step (d) may be practiced by transmitting all of the collected customized business forms or brochures together (e.g. electronically over phone lines).

The high resolution graphics that are imaged in the practice of step (e) are preferably color, and can be effected utilizing a printing press or various types of non-impact printers, such as ion deposition printers such as Midax®, Xeikon®, or Indigo® imaging equipment.

The text templates may include price templates, and step (b) may be practiced to select at least one price template. Also, preferably at least one of the graphic templates includes multiple and distinct graphic depictions; and step (a) may be practiced to select a graphics template with multiple and distinct graphic depictions, and step (b) may be practiced to select a price template for each of at least two different graphic depictions (and preferably all of the graphic depictions selected).

The customized business form or brochure to be produced may have multiple pages, in which case steps (a) through (c) are practiced for each of a plurality of the multiple pages (possibly all of the pages), and the multiple pages produced are transmitted together in the practice of step (d).

The method may comprise the further step (f) of inputting further, variable, textual data onto the screen during the practice of step (b), the further textual data saved during the practice of step (c) in electronic format as part of the customized business form or brochure. Step (f) may be practiced using a keyboard. The selecting device may be a mouse, and steps (a) through (c) may be practiced using a mouse. Also, especially where step (d) is practiced electronically, step (d) may be initiated by using the mouse.

According to another aspect of the present invention a method of producing customized business forms or brochures is provided comprising the following steps: (a) At the user station using the selection device to control the processor, selecting one or more low resolution graphics templates in electronic form from the plurality of templates, and displaying graphics corresponding to the graphic templates selected on the video monitor, to provide a customized business form or brochure in electronic format. (b) Using the selection device and processor electronically saving the customized business form or brochure in electronic format. (c) Electronically transmitting the saved customized business form or brochure in electronic format over phone lines to a printing installation, without transmitting a document, physical graphics, or templates from the user station. And (d) at the printing installation imaging a physical copy (e.g. paper) of the customized business form or brochure in electronic format transmitted in step (c), the customized business form or brochure in physical form having high resolution color graphics corresponding to the template graphics selected in step (a).

It is the primary object of the present invention to allow the simple yet professional looking creation of customized business forms or brochures at a user location, even by a user without layout experience, using low resolution graphics, and providing transmission of the customized business form or brochure in electronic format from the creator to a printing facility without the necessity of transmitting a final document with high resolution graphics, yet allowing ready production of a final customized business form or brochure in physical (e.g. paper) form at a printing facility, the physical form of the document produced having high resolution color graphics. This and other objects of the invention will become clear from an inspection of the detailed description of the invention and from the appended claims.

BRIEF DESCRIPTION OF THE DRAWINGS

FIGS. 4 through 12 are schematic illustrations of various screens that appear on the video monitor showing exemplary detail during practice of an exemplary method according to the high level flowchart of FIG. 3, for the production of customized business forms or brochures;

FIG. 14 is a schematic illustration of equipment utilized at a manufacturing (printing) facility;

FIGS. 15 and 16 are high level flowcharts showing, respectively, the operation of a customer service station and production station of FIG. 14.

DETAILED DESCRIPTION OF THE DRAWINGS

Figure 1:
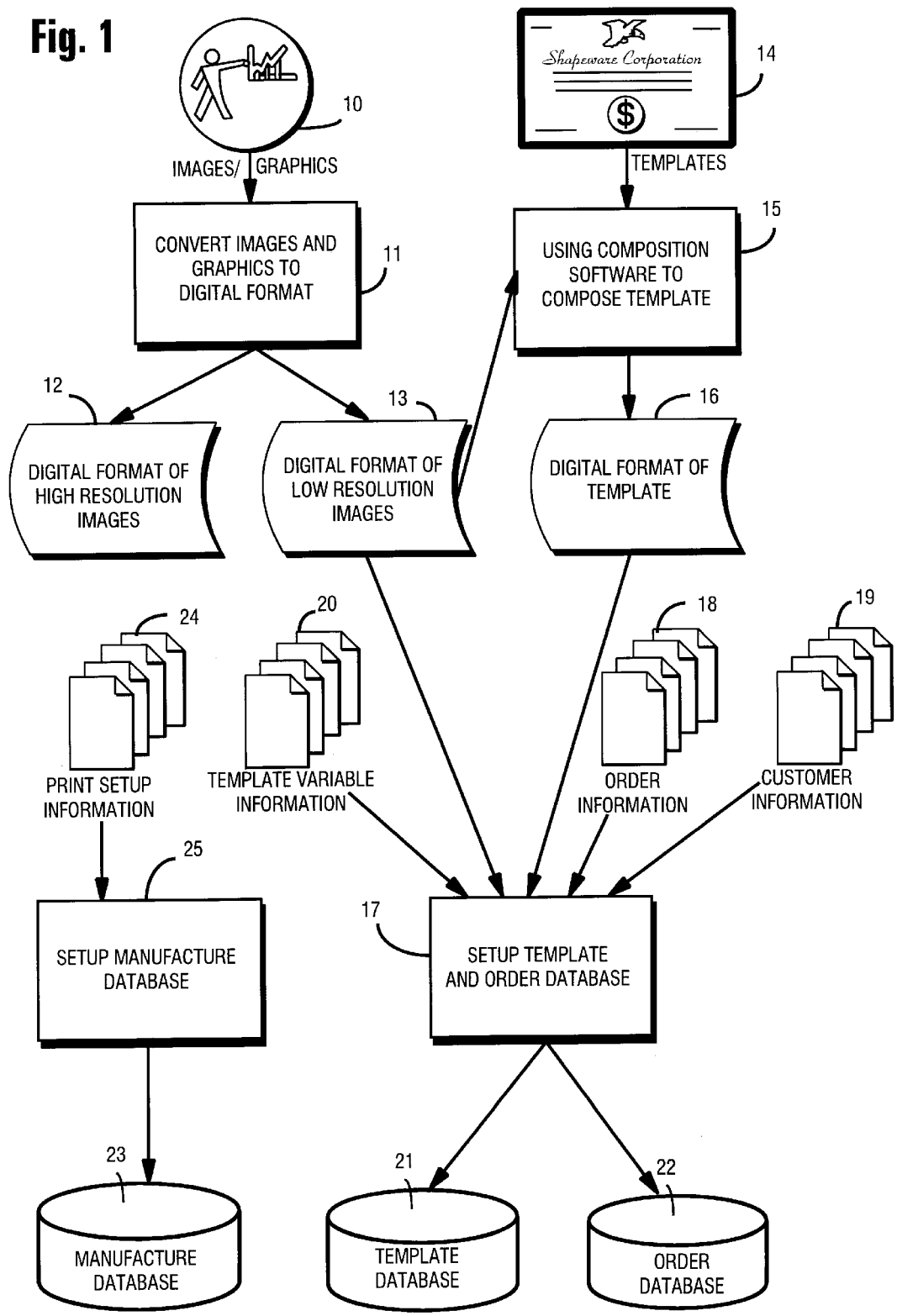
FIG. 1 is a high level flowchart showing the setup of various databases in order to facilitate practice of an exemplary method according to the present invention.

A significant purpose of the method according to the present invention as illustrated in the drawing figures is to allow an inexperienced end user to create, using low resolution graphics, customized business forms or brochures at a user station on a video monitor, in electronic format, and then to receive such forms or brochures in electronic format at a printing facility without the necessity for the end user to transport physical documents, especially documents with high resolution color graphics, to the printing facility. Yet at the printing facility the forms or brochures may be imaged with high resolution color graphics, while at the same time composition and order entry are tightly integrated together, and automation at the printing facility, and at various other stages, is optimized.

FIG. 1 is a high level schematic representation of a setup work flow. Images and graphics are provided from a source 10 (by skilled, experienced creators) to box 11 where the images and graphics (including photographs) are converted to digital format in the form of high resolution images 12 and low resolution images 13. Various templates 14 are provided to box 15 where—using suitable conventional composition software—templates are composed, including utilizing the low resolution digital format from 13. Digital format of the low resolution templates is then formed as indicated at 16 and provided to setup template and order database 17. Order information from source 18 and customer information from source 19 is also provided to the box 17, as well as digital format low resolution images information from source 13. Template variable information from source 20 is also provided to box 17. The output from box 17 is the template database 21 and order database 22.

Further illustrated in FIG. 1 is the production of a manufacturing database 23 utilizing print setup information from source 24 which is provided to set up manufacturing database 25 for the creation of the manufacture database 23. Once the databases 21 through 23, and the digital format of the template 16 and images 12, 13 are created then it is possible to practice the method according to the present invention.

In the practice of the invention as indicated by FIG. 1, an exemplary procedure is as follows:

Step 1: Create generic templates using commercially available off the shelf composition software, such as Adobe PageMaker (15), and save the templates in electronic format (16). Each generic template contains specifically defined areas where variable text and graphics can be replaced to customize the document.

Step 2: Any graphics that will be utilized to create the customized documents are converted to digital format (11), in both high (12) and low resolutions (13). High resolution graphics (12) are maintained at the printing facility. Low resolution graphics (13) are stored at the end user site.

Step 3: Define end user requirements, including the following:

Order information, such as ship to, bill to (18).

Customer information, such as user log on and tracking information (19).

Template variables such as text and graphics that will be used to create customized documents (20) for each generic template.

The relationship between each generic template, the template's variables, and associated pop up lists that provide selection options for each variable.

Template tree hierarchy information (see FIG. 4), which provides the end user with a method of selecting a generic template based on a business category.

Print setup information, such as print device, imposition, and finishing requirements (24) for each generic template.

Step 4: Setup the template database (17) to contain the information for each generic template created in step 1, and all text and graphic variables that can be replaced in the generic template to create customized documents. The resulting template database (21) is stored at the end user computer.

Step 5: Setup the order database (17) to contain the information used to create an order, such as ship to, bill to. The resulting order database (22) is stored at the end user computer.

Step 6: Setup the manufacture database (25) to contain the relationship between each generic template and printing information for every customer (end user), such as printing device, imposition, and finishing requirement for each generic template. The resulting manufacture database (23) is stored at the printing facility.

Figure 2:
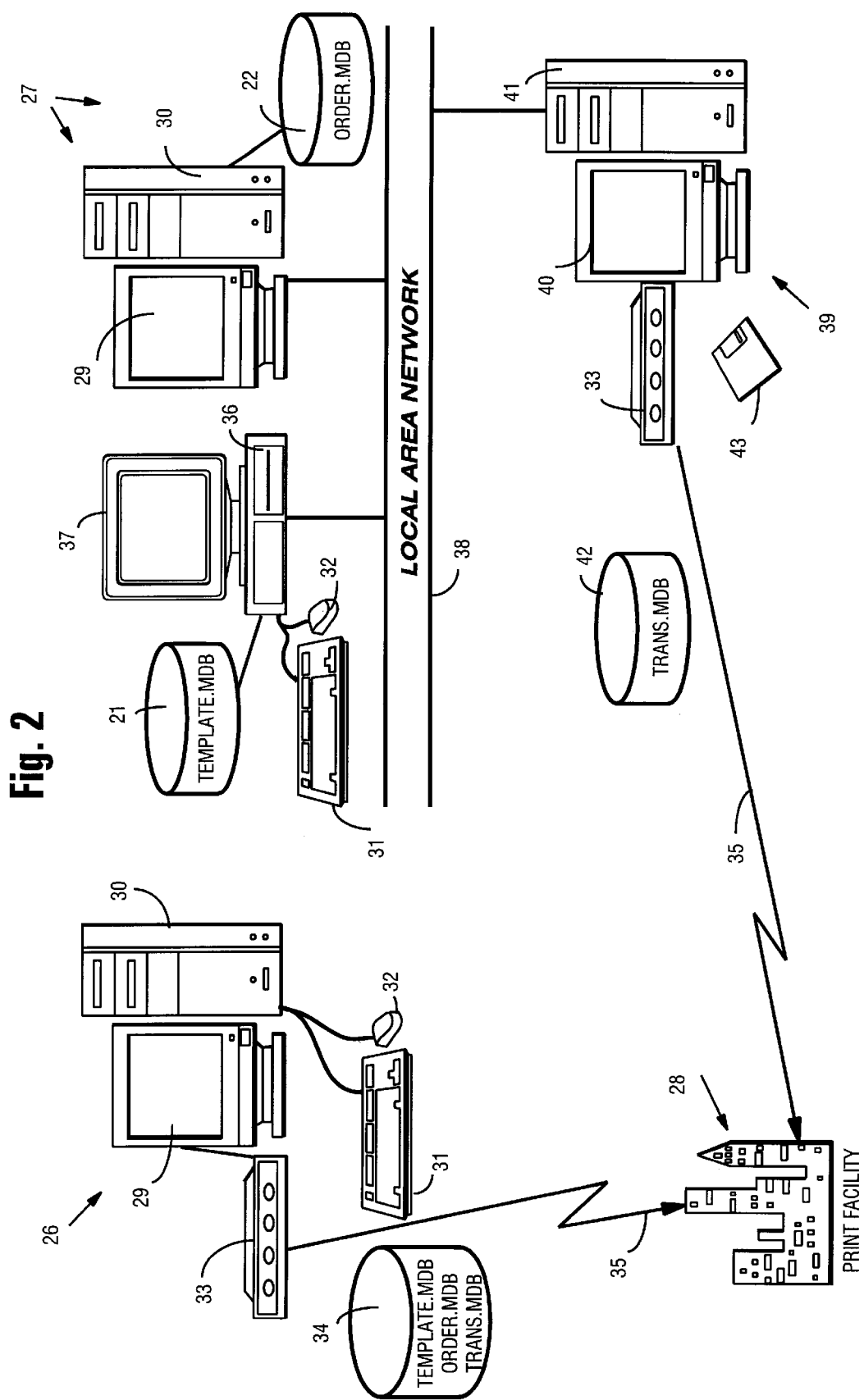
FIG. 2 is a schematic illustration of various equipment that may be used in the practice of the method according to the present invention.

FIG. 2 illustrates two complementary or alternative user stations 26, 27 where the actual act of composing a customized business form or brochure, by an end user even without layout experience, is practiced, ultimately for supply to a printing facility shown schematically at 28 in FIG. 2. The facility 28 will have been supplied with the high resolution graphics from 12.

The system 26 is a stand alone system, and includes a video monitor 29, a processor (e.g. in casing 30), and a selection device such as a keyboard 31 and/or a mouse 32 (the term "mouse" is used to mean all conventional and electronic components for quickly allowing cursoring around a video monitor, such as the monitor 29, and selection of various "material" thereon, including balls and piezoelectric posts), preferably both the keyboard 31 and mouse 32 being provided. The system 26 also preferably has a modem 33 and is supplied with data from database 34 which includes both of the databases 21 and 22, from FIG. 1, as well as transmission protocols and the like data. In this way the selection device 32, for example, can be used to create a customized business form or brochure in electronic format on the video monitor 29, save it, and then electronically transmit it over phone lines (shown schematically at 35 in FIG. 2) or other media to the print facility 28.

The system 27 is an alternative to, or in addition to, the system 26. The system 27 includes a user station which is shown in the form of a PC 36 (having a processor), a video monitor 37, and selection devices 31, 32. Connected to the PC 36 is local area network—shown schematically at 38—another video monitor 2, processor 30, and the like. The template database information 21 is provided to the PC 36, while the order database 22 is connected to the processor 30 for administration purposes, the equipment 29, 30 associated with the system 27 performing an administration server function.

Also illustrated in FIG. 2, connected to the local area network, is an administration station shown generally by reference 39, which may have video monitor 40, processor 41, and modem 33, with transmission database 42 providing protocols and like information for transmission of electronic format information from modem 33 associated with system 39 over phone lines 35. The systems 27, 39 are utilized in situations where it is desirable to collect multiple customized business forms or brochures in electronic format from a plurality of different user stations (like station 26, or like the station having PC 36) so that identifying indicia may be assigned to each customized business form or brochure of a plurality thereof, and the collected forms/brochures may be transmitted together (e.g. in the same disk, or substantially simultaneously over the phone lines 35).

While the transmission of information electronically, e.g. over phone lines 35, as illustrated in FIG. 2 is preferred, under some circumstances the electronic format of the forms/brochures may be saved to disk—as illustrated schematically by the disk 43 in FIG. 2—which may be then physically transmitted to the printing facility 28, or other conventional transmission modes may be employed.

Figure 3:
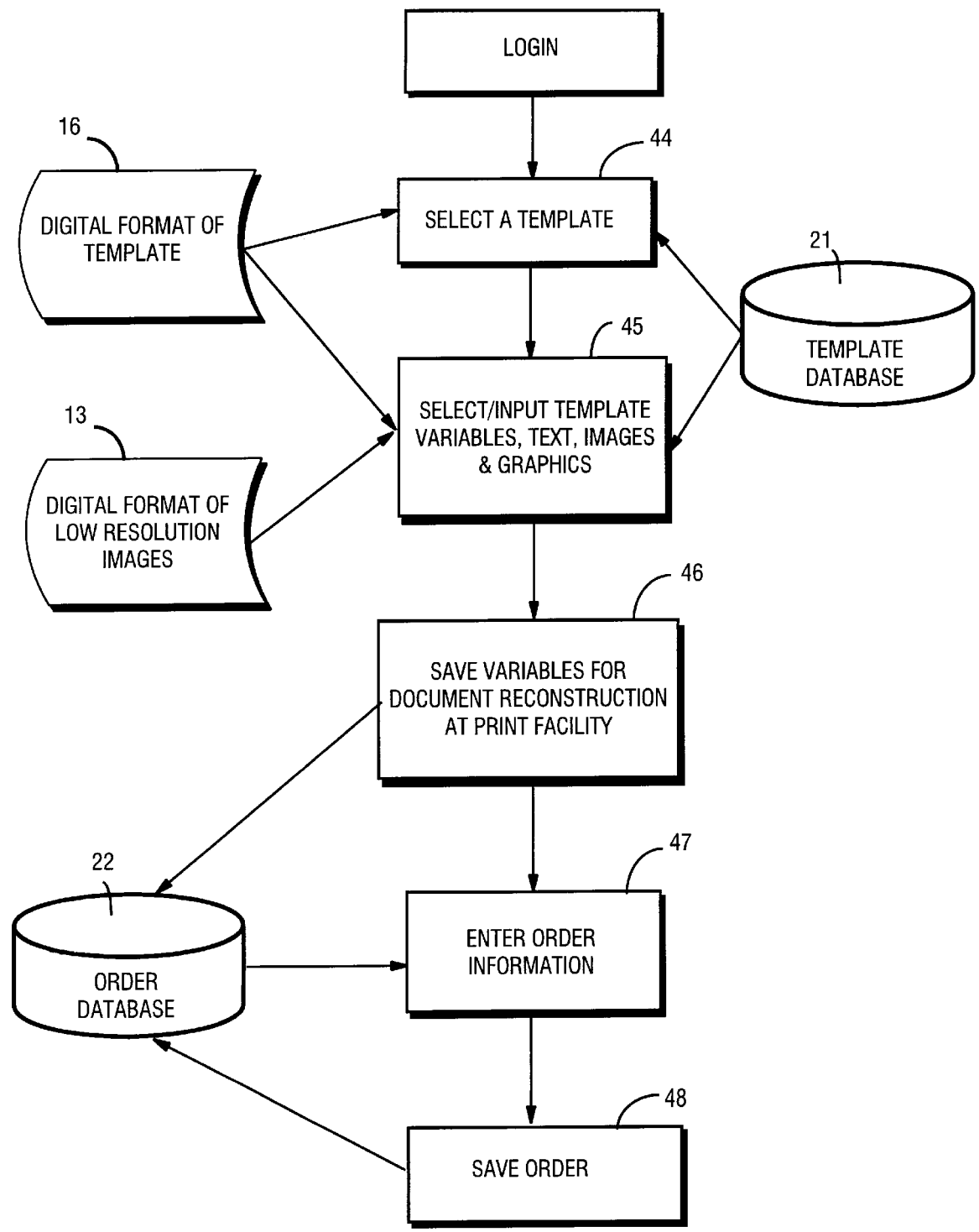
FIG. 3 is a high level schematic showing the creation of a customized business form or brochure at a user location, pursuant to the method of the present invention.

FIG. 3 is a high level flowchart illustrating various procedures practiced according to the method of the present invention with data supplied from elements 13, 16, 21 and 22 (all created as illustrated in FIG. 1). As illustrated in FIG. 3 after log on an appropriate low resolution (color or merely black and white) graphics template is selected utilizing the selecting device 31, 32, as indicated by box 44, and then various other textual information (also from templates), variable text, images and graphics from the templates (e.g. 13), or graphics or text created or inputted right on the monitor 29, 37, is provided as illustrated at 45. Then the customized business form or brochure so created on the monitor 29, 37 is saved, e.g. utilizing selection device 32, as indicated at 46. Order information (such as the number of copies of the brochure, where the brochures are to be shipped) is also entered onto the video monitor 29, 37 (e.g. utilizing input device 31) as illustrated schematically at 47 in FIG. 3, and the order information is saved, e.g. utilizing selection device 32, as indicated at 48. After saving the order information, with the customized business form or brochure in digital format, are transmitted together, e.g. over phone lines 35 through modem 33.

As seen in FIG. 3, the invention further relates to a GUI application that provides the end user interface between generic templates and customer-defined variable information. It allows a point-and-click selection of text and graphics or direct input of variable information to create the final customized document. Once the document is finalized, the end user places an order. The ordering information along with variable information (selected text and graphics) is saved in the DDS order database file 22. An exemplary procedure is:

Step 1: Log in to DDS User

Figure 4:
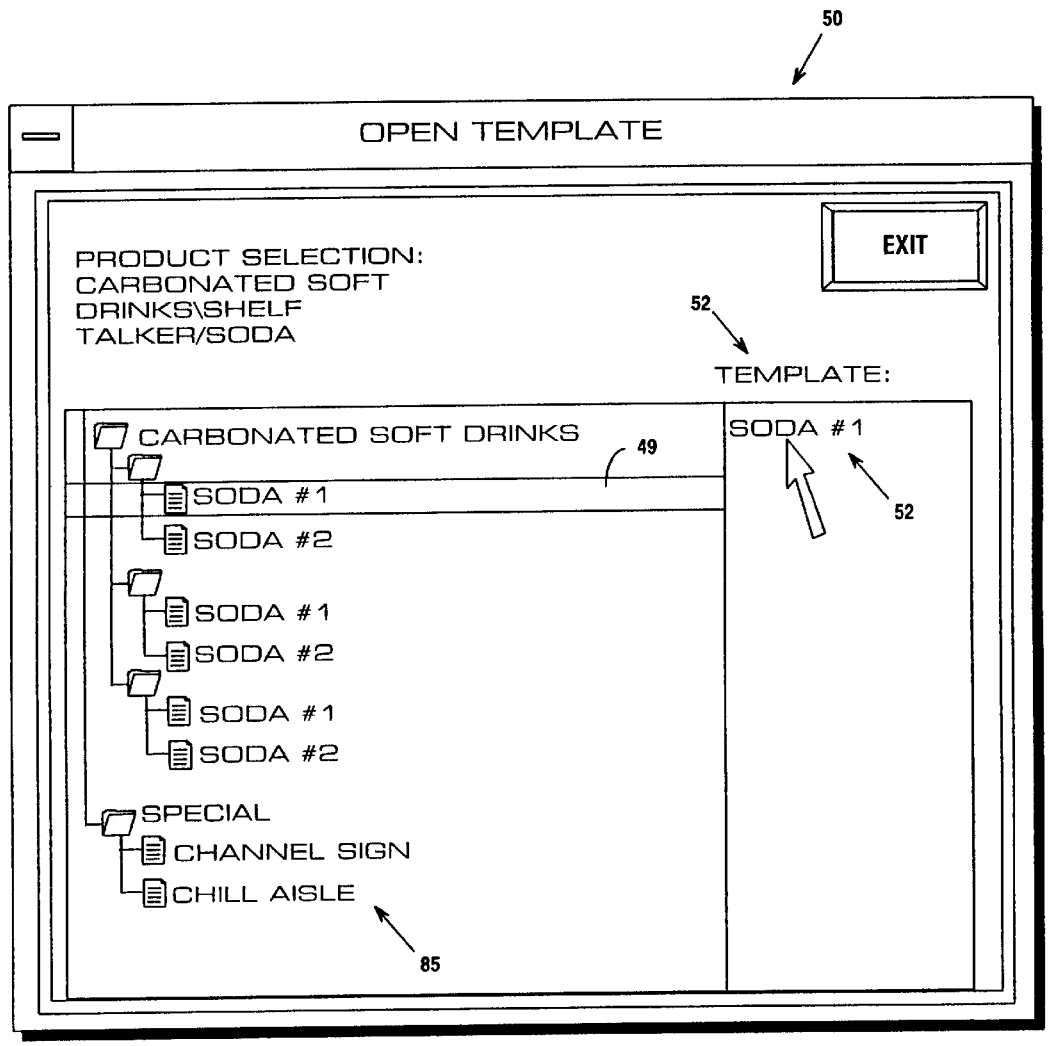

Step 2: Select a generic template from template hierarchy (44). The template hierarchy information is stored in the template database (21). The selected generic template (16) will be displayed with low resolution graphics using commercially available of the shelf composition software, such as Adobe PageMaker. [FIG. 4 shows an example of a template hierarchy.]

Figure 5:
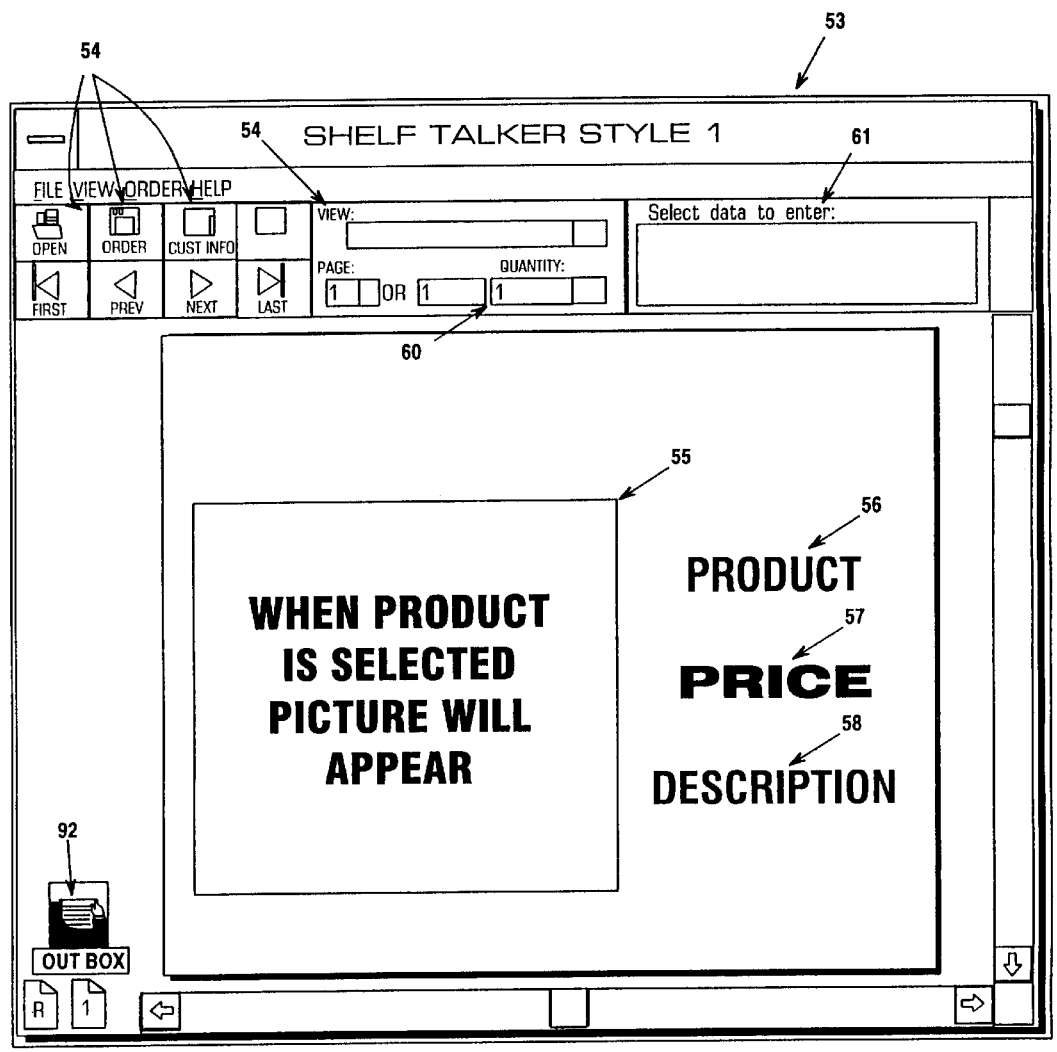
Figure 6:
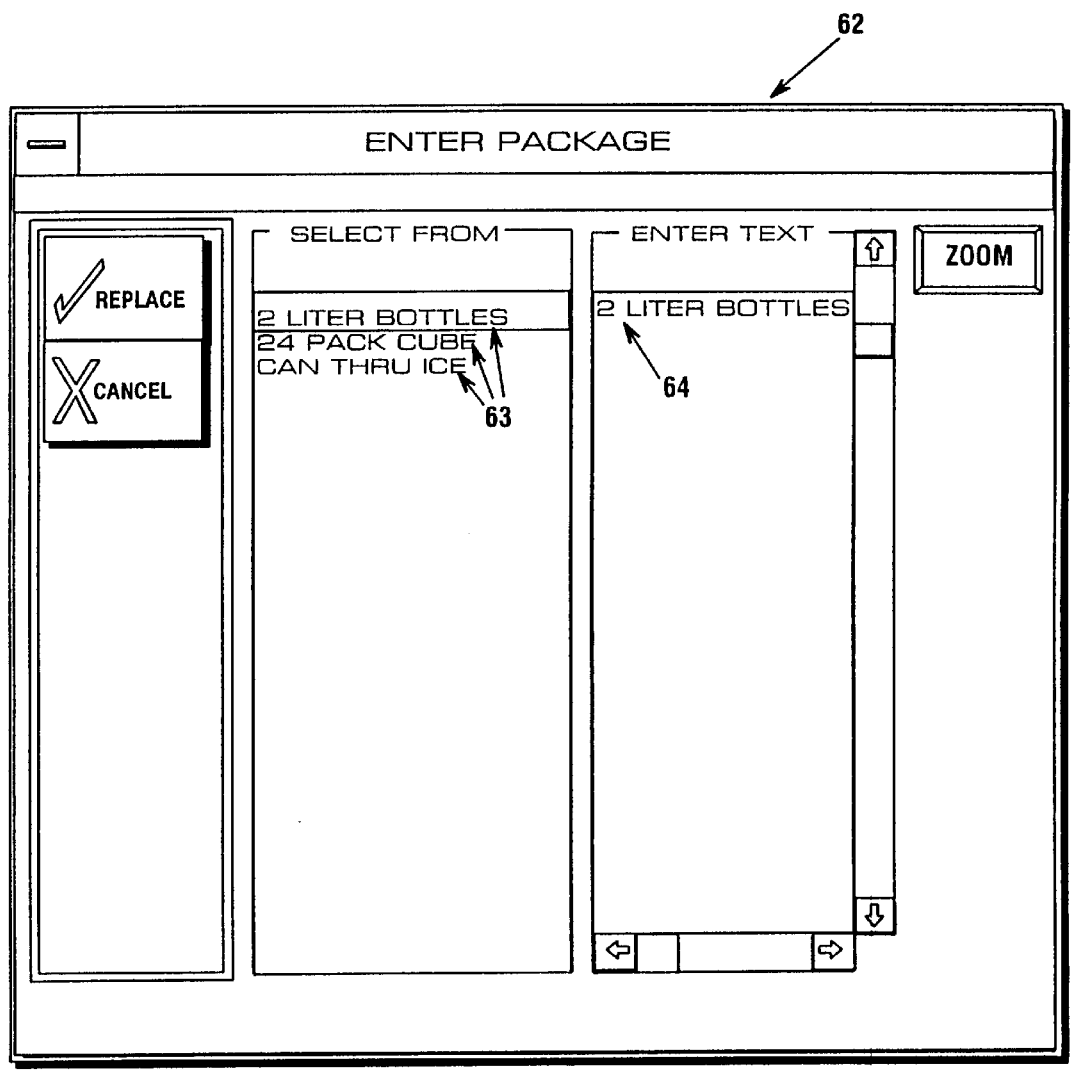
Figure 7:
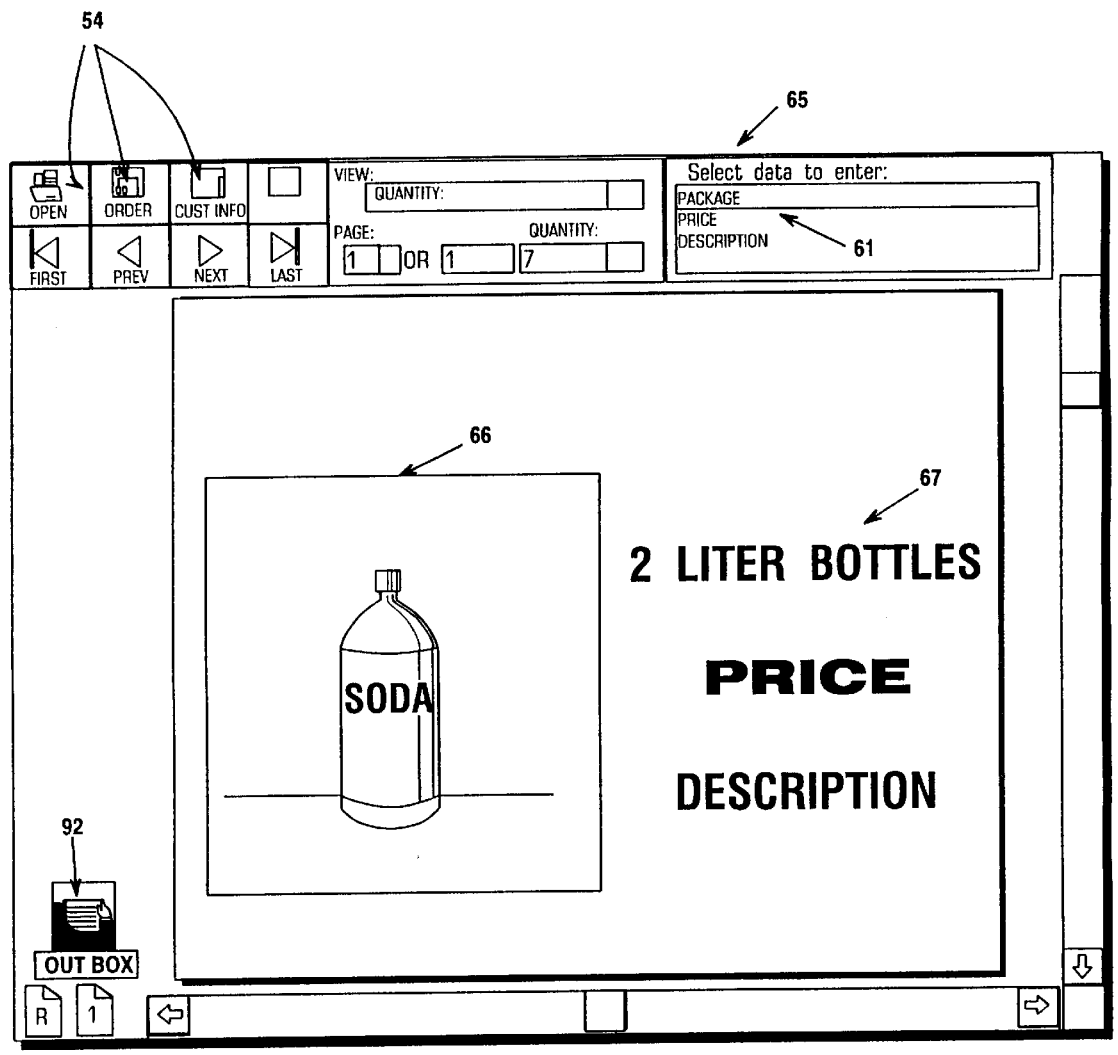

Step 3: Based on the selected generic template, a list of template variables is provided (61). The end user selects one template variable (61) and is presented with a pop up list of associated options. For example, if the "Product" template variable is selected, the "Enter Product" pop up list (FIG. 6) provides the options (FIG. 6, 63). When the end user selects an option, it is replaced in the specified area of the generic template using commercially available off the shelf composition software. An additional feature of DDS is the ability to group multiple replaceable items with one selected template variable. To expand upon this concept, in the prior example when the "Product" template variable is selected, it could actually replace a "Product" (FIG. 5, box 56), as well as the "Product Picture" (FIG. 5, box 55). Therefore, with one selection, the end user has customized two areas of the generic template.

Step 4: Save the selected template variables (46) to the order database (22) for recreating the customized document at the printing facility. The generic template does not change and the customized document is not saved. At the printing facility, DDS Production merges the saved selected template variables into the associated generic template to recreate the customized document (FIG. 16).

Step 5: Enter order information, such as quantity, purchase order number, ship to, and bill to (47).

Step 6: Save the order information (48) to the order database.

Once all the orders are completed, it is the responsibility of the end user with administrative privileges to transmit the orders to the printing facility.

FIGS. 4 through 12 illustrate various screens that may appear on the monitors 29, 37, 40. FIGS. 4 through 12 are exemplary only and may vary widely depending upon the particular goods or services to which the customized business forms or brochures to be created relate, and are only some of the most significant screens. A wide variety of other standard-type log on, lead in, transmit, or variable screens also are typically provided. FIGS. 4 through 12 are schematically illustrated with respect to the production of customized business forms or brochures relating to soft drinks, but are clearly representative only, again virtually any product or service being utilizable in the practice of the method of the present invention, for the production of forms/brochures.

FIG. 4 relates to an "open template" screen 50 in which the low resolution graphics from the templates are to be selected. Using the selection device 32 a particular product category, from a number of different levels of product categories, is selected, such as the "soda #1" category 49 illustrated on the open template screen 50 of FIG. 4. The product category 49 is selected by clicking on it once highlighted, utilizing mouse 32, which then illustrates a particular template, under template heading 51, selected, namely the template 52. Other templates may also be provided under the category 51 by clicking thereon, as illustrated at 49 for the template 52. Once the desired template 52 (or plurality of templates) is provided under heading 51, then to provide the template on the monitor 29, 37 one clicks on template 52 representation using the mouse 32. This produces the screen illustrated at 53 in FIG. 5.

The screen 53 preferably also has various options displayed thereon, as illustrated schematically at 54, which are preferably illustrated in a "Windows"® format, although other formats may also be utilized. Also in this particular case on the video monitor 29, 37 screen 53 will appear an area 55 reserved for graphics, as well as a plurality of other areas such as the areas 56, 57, 58 provided for particular textual information. The view size may be selected in the view field 59 using selection device 32, while the quantity desired may be selected in is the quantity field 60. Then from the "select data to enter" field 61 the package, price, or description (corresponding to 55, 56; 57; 58 displays, respectively) are selected, e.g. utilizing the selecting device 32, preferably the "package" item from field 61 being selected first.

Screen 62 of FIG. 6 is a schematic representation of an exemplary screen that may be provided when the "package" item in field 61 (from screen 53) is clicked on, illustrating three different graphic templates 63 that may be selected. Again utilizing selecting device 32 one of the potential templates 63 (any number of templates may be provided) of low resolution graphics may be selected, or a plurality may be selected, merely by clicking on using the mouse 32, the selected low resolution graphics template appearing in the "enter text" field as illustrated at 64 in FIG. 6. Then by clicking on the textual information 64 in screen 62—as illustrated by the screen 65 of FIG. 7—low resolution graphics corresponding to the selected "product", as well as preferably textual information associated therewith, will appear (in either black and white or color) at what were the areas 55, 56 in FIG. 5, as illustrated by the graphics 66 and associated textual information 67, in FIG. 7.

The business form/brochure is further created by clicking on the "price" and "description" items in field 61. When each of the items "price" "description" appear on a separate screen a number of textual templates are illustrated from which to select (e.g. prices ranging from 79 cents to $2.39 under the "price" selection), and all sorts of descriptive textual templates (such as "bottle", "enter to win", "ice cold", "managers special" and the like) being displayed on the monitor 29, 37 (in either black and white or color) when the "description" item in field 61 is selected.

Figure 8:
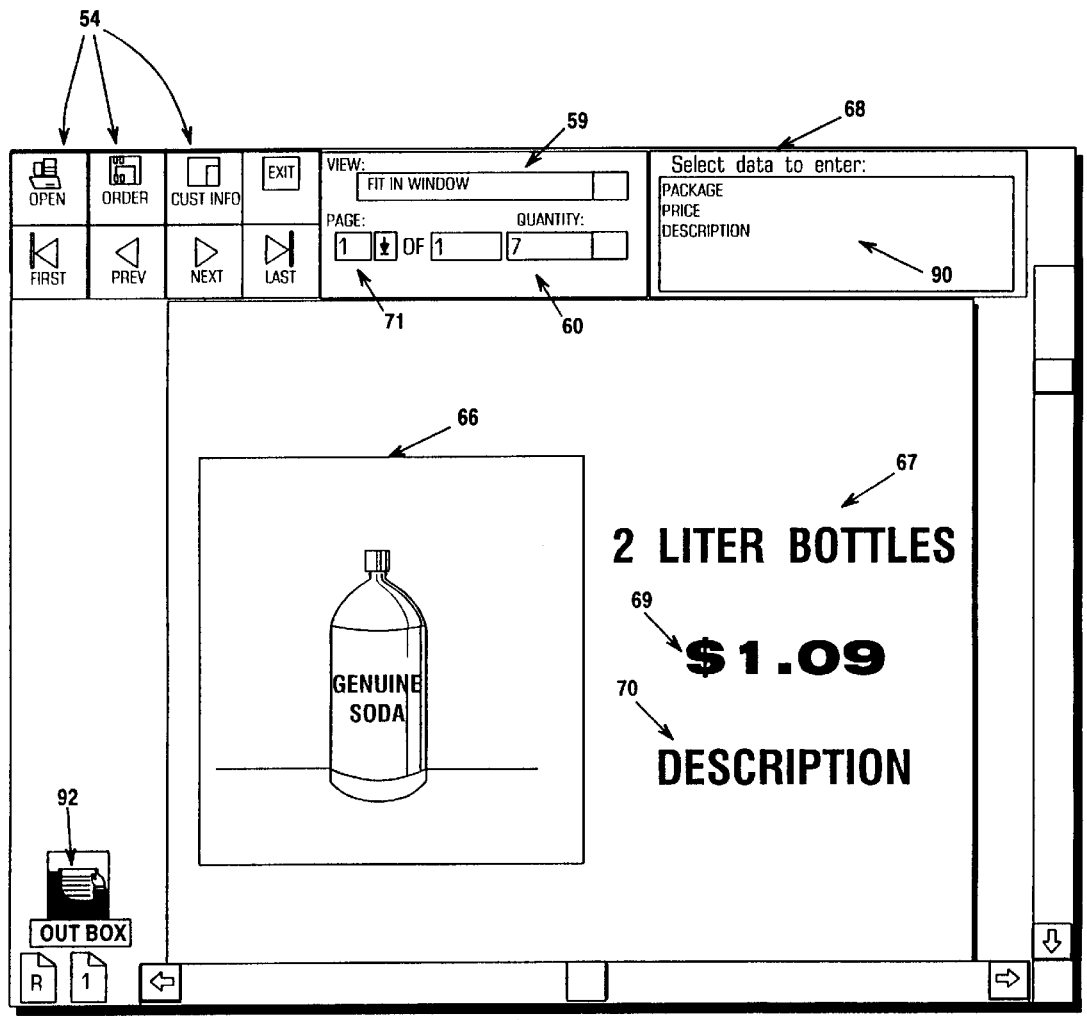

FIG. 8 shows an exemplary final screen 68 like the screen 65 only with a numerical price 69 being provided where the area 57 was for screen 53 of FIG. 5, and the descriptive text 70 being provided where the item 58 was provided in FIG. 5. If desired, utilizing the keyboard 31, other textual information may be provided on the screen 68 as part of the final business form/brochure, and using the input devices or software (compatible with facility 28) other low resolution graphics may also be input.

Figure 9:
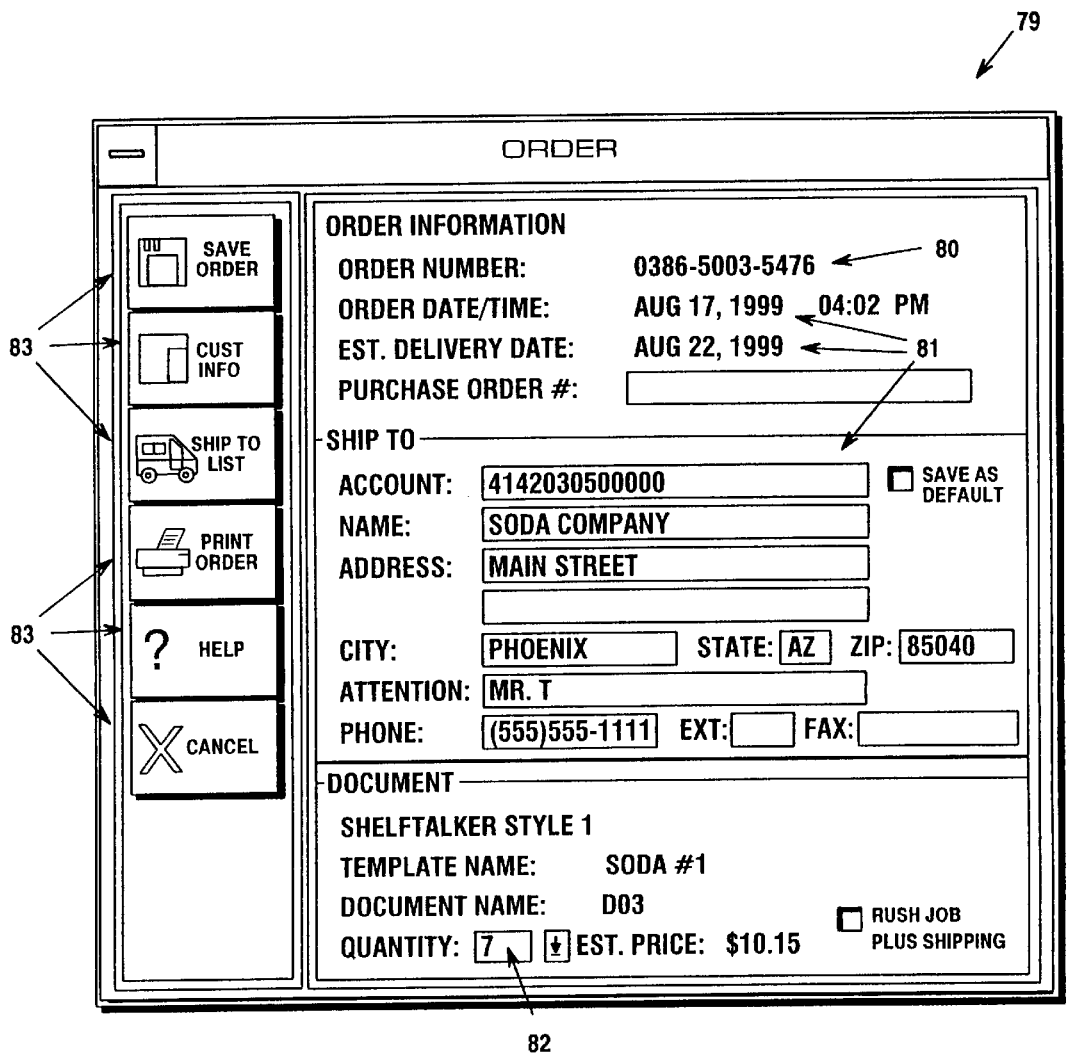

If what is provided by screen 68 is only to be one page of a multiple page form/brochure, then the "page" field 71 will be manipulated, and the subsequent pages will be produced in the same manner described above for the first page with respect to FIGS. 4 through 8. Ultimately when the "final" form/brochure has been created, then one clicks on the order item of the items 54 again using selection device 32, and the screen 79 of FIG. 9 is then displayed.

On screen 79, which is the "order" screen, order number 80 automatically assigned by processor 30, 36 or 41. All the other necessary fields 81 (not all of the fields provided may be necessary ones) are filled in preferably utilizing the selection device 31, with the quantity information at 82 automatically transferring from the field 60 of the screen 68, but being adjustable on the screen 79 again using the mouse 32. The name of the template which was used to create the form/brochure is preferably also displayed as illustrated in FIG. 9, and there are various other button options 83 provided on the screen 79. Typically the button 83 relating to "save order" will be selected utilizing the mouse 32, and the form/brochure in electronic format will be saved for ultimate transmission to the print facility 28.

Figure 10:
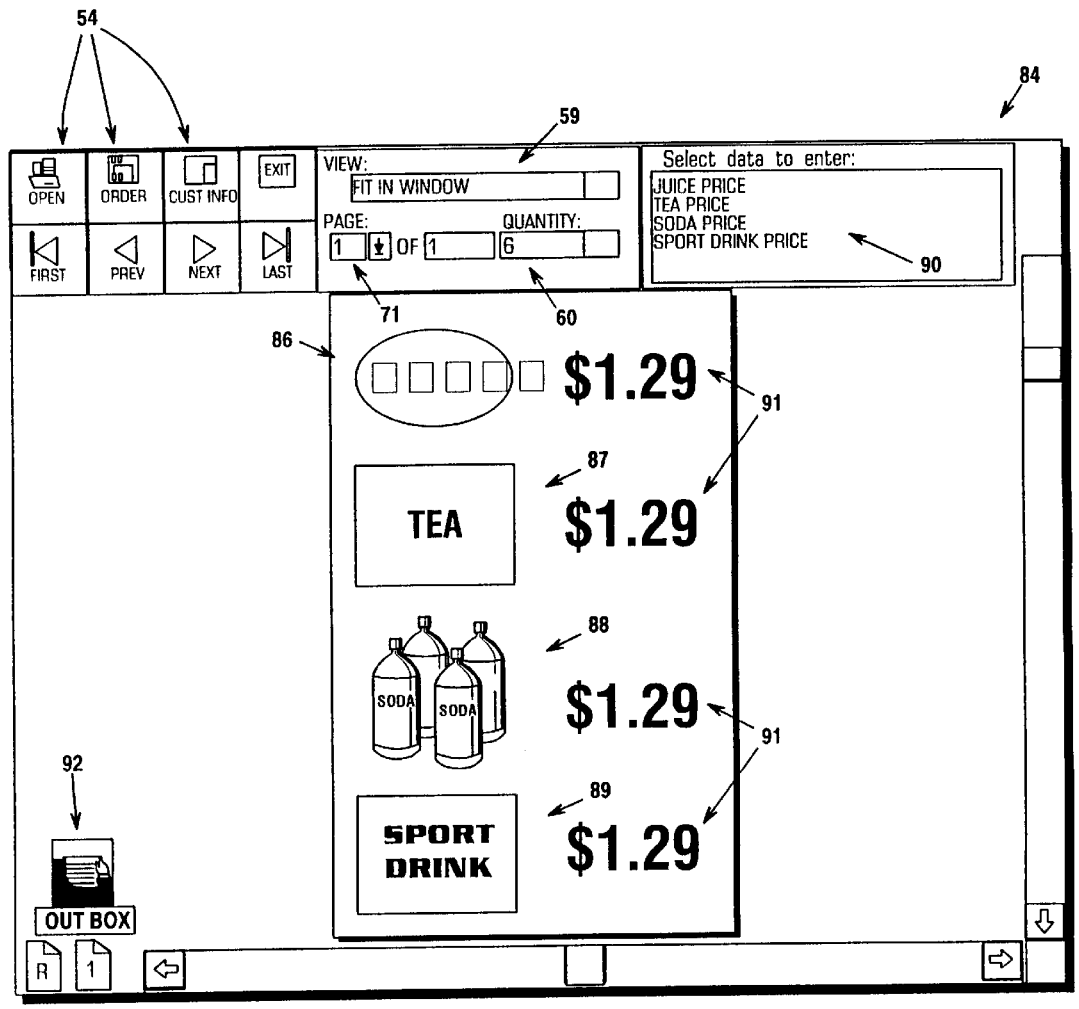
Figure 12:
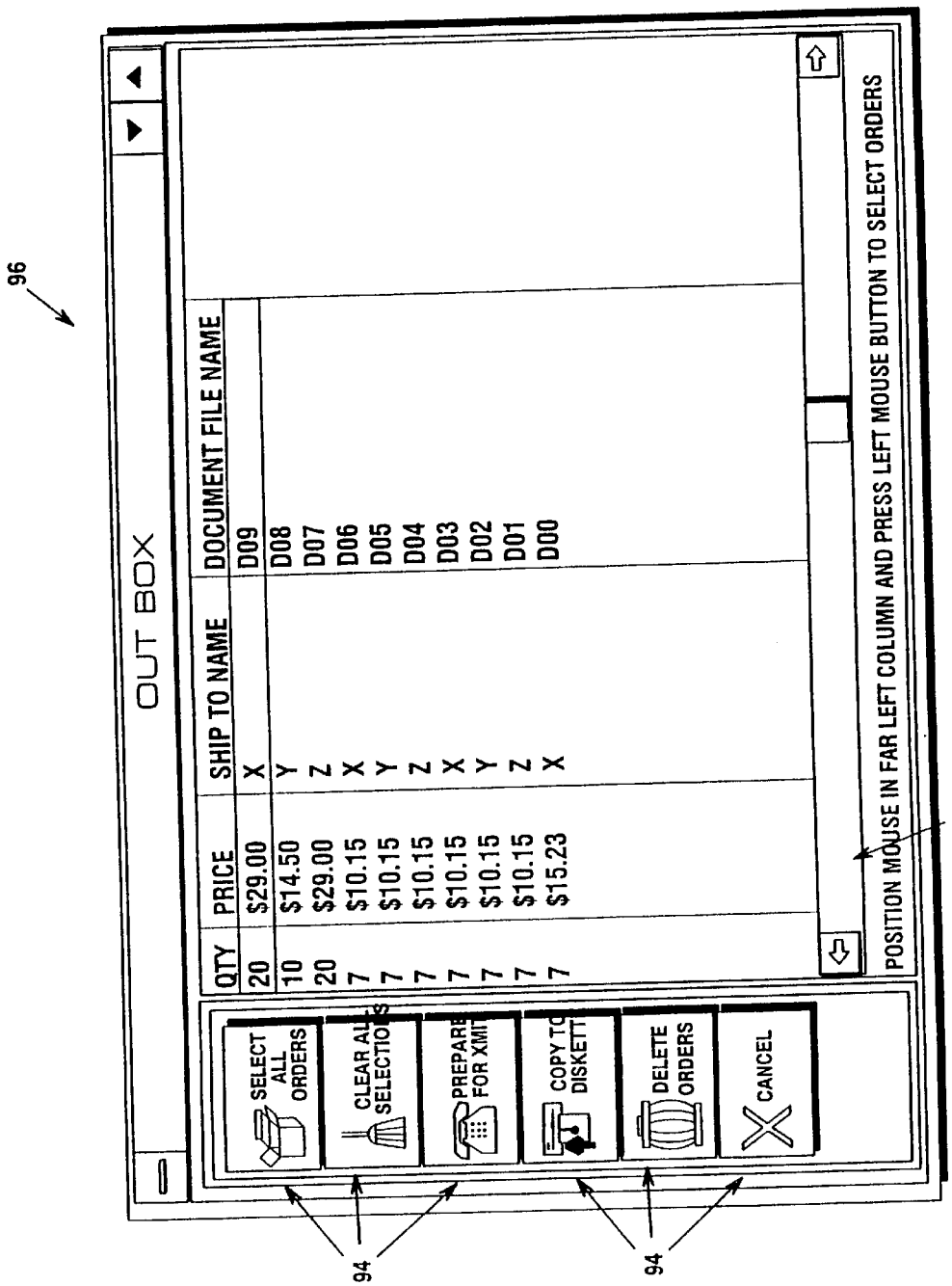

FIG. 10 schematically illustrates another exemplary screen 84 that is displayed, for example, when the item 85 from the templates available "open template" screen 50 of FIG. 4 is selected. In this case multiple and distinct graphics (including photos) depictions 86–89 are provided, and a price for each may be selected, e.g. by clicking on the appropriate data item found in the field 90 to change the price items 91 associated with the graphics 86–89, respectively, individually. Price items 91 again preferably are displayed on subsequent screens as possible textual templates, the appropriate textual template being selected and entered and then appearing on the screen 84 in the appropriate place 91.

While only two exemplary types of forms/brochures are illustrated in FIGS. 8 and 10, it should be understood that an almost infinite number of different forms/brochures are possible depending upon the number of graphics templates, textual templates, and the like.

Once all of the appropriate forms/brochures and/or pages have been composed, the "outbox icon" 92 (see FIGS. 5, 7, and 10) is selected (e.g. by double clicking with mouse 32) to provide the screen 93 illustrated in FIG. 11. Once the screen 93 is reached any of the options/buttons 94 may be exercised, allowing all of the orders to be chosen, individual orders chosen, or the like, by clicking on utilizing the mouse 32. If it is desired to see more information about any one of the orders in a row on the screen 93, by using the scroll bar 95 on the bottom of the screen 93 more information will be displayed. For example, screen 96 of FIG. 12 may then be provided. From either screen 95 or 96 once the proper selections or confirmation has been made the buttons 94 that are appropriate can be selected to prepare is for transmitting (e.g., over phone lines 35) all of the orders displayed on the screens 93, 96, or all of the orders may be copied to a disk, and after the orders are properly handled the cancel button of the selections 94 may be clicked on to return to the screen of FIG. 4 (or to an earlier log on or general information screen).

Figure 13:
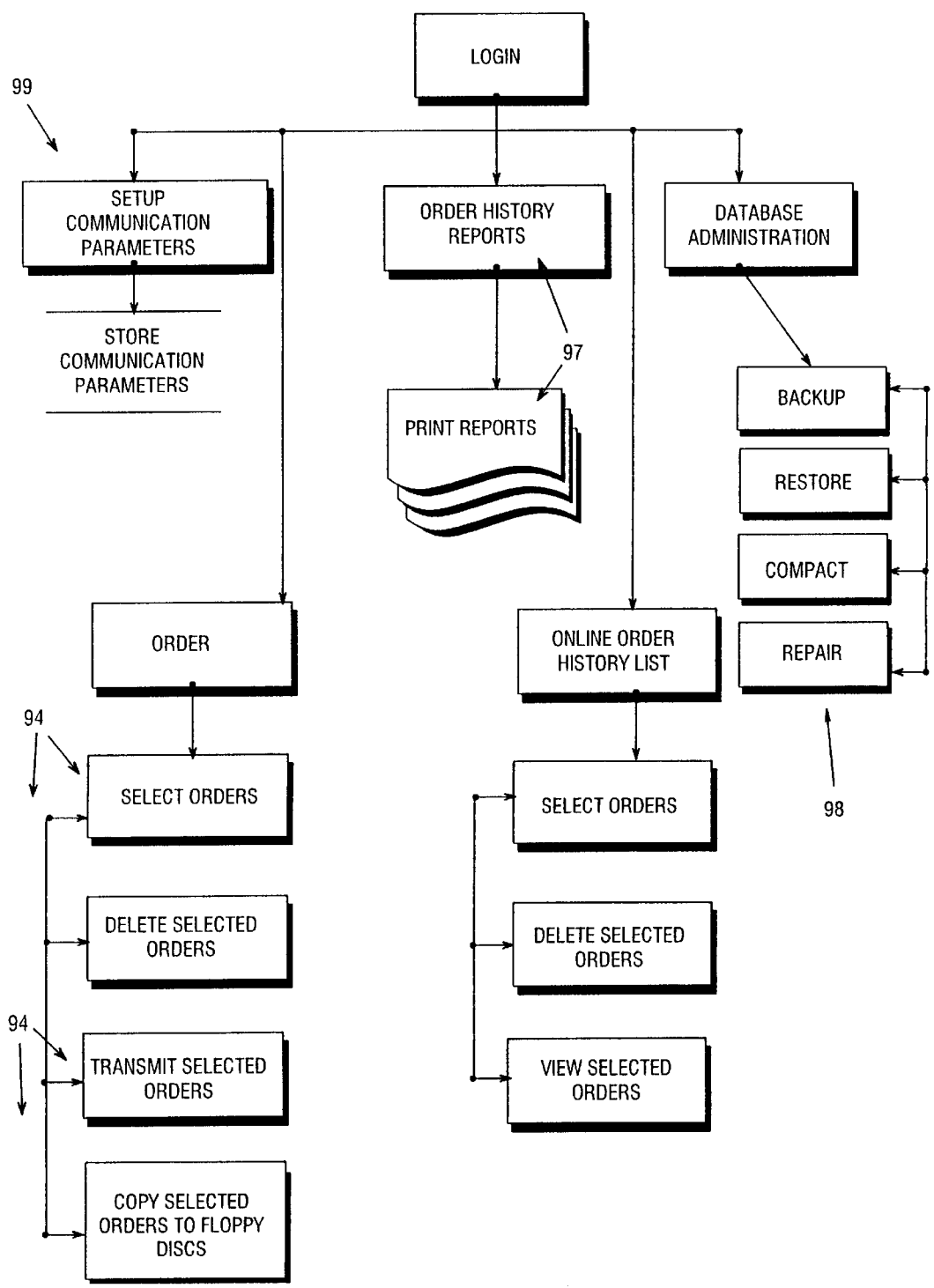
FIG. 13 is a high level flowchart showing administration work flow for the handling of multiple orders for customized business forms or brochures produced according the method of FIGS. 3 through 12.

FIG. 13 is the high level flowchart indicating the type of other information that may be provided at the station 39 which collects data from all of the individual user stations, e.g. connected to the local area network 38, for common transmission along phone lines 35. In addition to the collection and transmission functions station 39 may also allow for the collection of data to generate the reports as illustrated schematically at 97 in FIG. 13, or to provide various other functions as illustrated schematically at 98 in FIG. 13, the setup communication parameters as illustrated schematically at 99 in FIGS. 13, or the like.

The DDS Administration of FIG. 13 further illustrates an exemplary GUI application that provides the end user with administrative privileges the ability to transmit orders to the printing facility, maintain order history, and perform database administration activities. The following exemplary procedure may be followed:

Step 1: Log in to DDS Administration. Only end users with administrative privileges will have access to this application.

Step 2: Set up and save communication parameters (99), such as modem type, file transfer protocol, and baud rate.

Step 3: Select orders (94) from the order database for transmission using a modem. The selected orders will be saved to the DDS Transmission database which is compressed. Then, the application establishes a communication session with an electronic Bulletin Board System (BBS) at the printing facility. The compressed DDS Transmission database is attached to an e-mail message and sent to the printing facility. After successfully transmitting the compressed DDS Transmission database, the transmitted orders are moved to order history.

Step 4: Alternatively, select orders (94) from the order database for transmission using diskette copy. This method is generally used when the communication lines are not available. The selected orders will be saved to the DDS Transmission database which is compressed. The compressed DDS Transmission database is copied to floppy diskette(s) and delivered to the printing facility. After successfully copying the compressed DDS Transmission database to the diskette(s), the copied orders are moved to order history.

Step 5: If an end user with administrative privileges determines that certain orders were placed in error, those orders can be selected and deleted.

Step 6: Order history information can be viewed either on line or in printed reports (97).

Step 7: Perform database administration activities (98), such as backup, restore, compact and repair the order database and template database.

At the printing facility, DDS Order creates the order contract and job ticket for the printing job (see FIG. 15).

FIG. 14 schematically illustrates an exemplary print facility 28 station system architecture, e.g. provided with orders from a number of different customer administrations 39. The system at the print facility 28 schematically illustrated in FIG. 14 typically includes a server station 100, which includes the modem 101 for receiving the data from the systems 39, the video monitor 102, the processor 103, and selection devices (like the devices 31, 32 but not shown in FIG. 14 for simplicity). The server system 100 is connected to a local area network 104 which in turn is connected to a customer service station 105, production station 106, and various imaging equipment illustrated at 107, 107' in FIG. 14. While FIG. 14 illustrates the imaging equipment as two different imagers or printers 107, 107', it is to be understood that any number of printers or imaging devices may be provided, such as conventional printing presses, or various types of ion deposition non-impact imaging equipment such as sold under the trademarks "Midax"®, "Xeikon"®, "Indigo"®, or the like, capable of printing or imaging high resolution color graphics (including photos).

At the customer service station 105 an order contract 108 and job ticket 109 are produced, which are conventional items that are necessary or desirable in printing facilities 28, while at the production station 106 a postscript file 110 is produced, as is conventional per se.

FIG. 15 shows a high level flowchart for the customer service station 105 which has self-explanatory boxes illustrating the high level steps in the production of the order contract 108 and job ticket 109 of FIG. 14.

In the DDS Order exemplary procedure of FIG. 15 a GUI application that provides the interface for Customer Service Representatives at the printing facility to decompress the DDS Transmission database, view the orders, generate order contracts, and issue job tickets for each printing job, is illustrated.

The DDS User and DDS Administrator systems can potentially be installed at many customer sites. Therefore, multiple customers could be sending DDS Transmission databases to the printing facility for production. Each DDS Transmission database is processed separately. The following exemplary procedure may be followed:

Step 1: Decompress the DDS Transmission database.
Step 2: Open the DDS Transmission database.
Step 3: View the orders
Step 4: Print job tickets (109).
Step 5: Print Order Contracts (108).

FIG. 16 is a high level flowchart showing the individual steps performed in the production of the postscript file 110 of FIG. 14 at the production station 106, each of the boxes in FIG. 16 also being self explanatory.

In the DDS Production flowchart of FIG. 16 an exemplary GUI application is shown that provides the interface for pre-press personnel at the printing facility to automate pre-press processes including imposition and providing the correct print device for generating the print ready file. This eliminates the preflight process and automatically generates proper imposition for each customized document.

The DDS User and DDS Administrator systems can potentially be installed at many customer sites. Therefore, multiple customers could be sending DDS Transmission databases to the printing facility for production. Each DDS Transmission database is processed separately. The following exemplary procedure may be followed:

Step 1: Select a customer (end user). The customer (end user) information is stored in the Manufacture database (FIG. 1, box 23). The Manufacture database contains the print set up information for multiple customers.

Step 2: Select a DDS transmission database for the selected customer. The DDS transmission database may contain multiple orders.

Step 3: Select orders from the selected DDS transmission database.

Step 4: Apply the template variables for the selected orders and create the customized documents.

DDS Production will automatically open the generic template which corresponds to the selected order. Using commercially available off the shelf composition software, such as Adobe PageMaker, the template variables are replaced in the proper areas of the generic template to create the customized document. During this process, all graphics are high resolution.

Step 5: Perform imposition which positions the document properly on the page.

Step 6: Create a print ready file, such as a Postscript file 110, for each customized document. This file is loaded to the printer for production. After production, the order is shipped to the customer.

Figure 17:
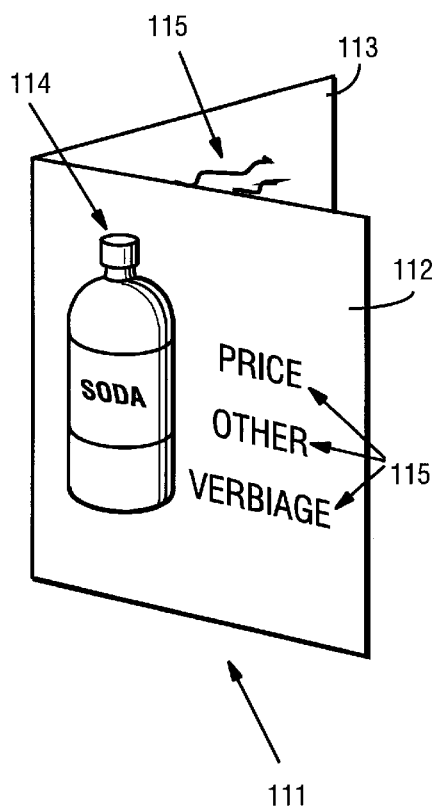
FIGS. 17 and 18 are schematic perspective views of exemplary documents that may be produced according to the method of the present invention.

Utilizing the imaging equipment 107, 107' final documents are produced at the printing facility 28. For example, the FINAL physical (paper) copy 111 of a brochure that was composed according to FIGS. 4 through 12 is schematically illustrated in FIG. 17. In this case the brochure 111 being illustrated as a multi-page document with at least the pages 112, 113 thereof containing different high resolution color graphics 114, 115 (preferably printed in color, e.g. four color, and the text 115 also possibly printed in color), which are imaged utilizing the equipment 107, 107', with of course related textual information. For example, the page 112 has graphics 114 and textual information 115 that corresponds to screen 68 of FIG. 8, but of course the graphics 114 are high resolution rather than the low resolution graphics 66 displayed on the screen 68.

Figure 18:
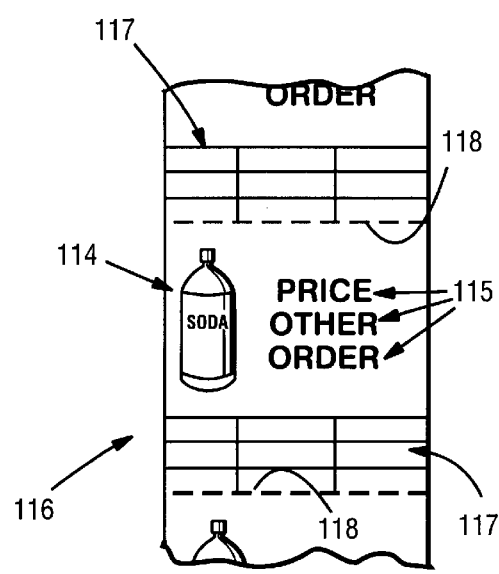

FIG. 18 schematically illustrates a one page business form 116 that may also be produced as described with respect to FIGS. 1 through 16, with the same high resolution color graphics 114 and textual information 115 as illustrated for the first page 112 of the brochure 111 of FIG. 17 (and again as corresponding to the screen 68 of FIG. 8). Also, various other images 117 may be printed or imaged on the business form 116, utilizing the equipment 107, 107' if desired to complete the business form 16, the information 117 being known from general relationships with the customer who transmitted the order, or as a result of specific information transmitted. While the business form 116 illustrated in FIG. 18 is a continuous business form, with perforation lines 118 or other lines of weakness separating individual copies of the forms, single sheet forms may be provided instead.

It will thus be seen that according to the present invention an effective method has been provided for the production of customized business forms or brochures by utilizing low resolution graphic templates, yet the forms/brochures produced being physical (e.g. paper) documents with high resolution color graphics. While the invention has been herein shown and described in what is presently conceived to be the most practical and preferred embodiment thereof, it will be apparent to those of ordinary skill in the art that many modifications may be made thereof which scope is to be accorded the broadest interpretation of the appended claims so as to encompass all equivalent methods and processes.

What is claimed is:

1. A method of producing customized business forms or brochures using a plurality of low resolution graphics templates in electronic form, and a plurality of text templates, using a user station including a video monitor, selection device, and processor, comprising the steps of:

(a) at the user station, using the selection device to control the processor, selecting one or more low resolution graphics templates in electronic form from the plurality of templates, and displaying graphics corresponding to the graphic templates selected on the video monitor;

(b) using the selection device selecting text related to the graphics selected from the text templates, and displaying the text corresponding to the text template or templates selected on the video monitor with the selected graphics to provide a customized business form or brochure in electronic format;

(c) using the selection device and processor electronically saving the customized business form or brochure in electronic format;

(d) transmitting the saved customized business form or brochure in electronic format to a printing installation without transmitting a document, physical graphics, or templates from the user station; and (e) at the printing installation imaging a physical copy of the customized business form or brochure in electronic format transmitted in step (d), the customized business form or brochure in physical form having high resolution graphics corresponding to the template graphics selected in step (a).

2. A method as recited in claim 1 wherein step (d) is practiced electronically over phone lines.

3. A method as recited in claim 1 comprising the further steps, between steps (c) and (d), of collecting multiple customized business forms or brochures in electronic format from a plurality of different user stations and assigning identifying indicia to each; and wherein step (d) is practiced by transmitting all of the collected customized business forms or brochures together.

4. A method as recited in claim 1 comprising the further step of inputting order information into the video monitor, and transmitting the order information, with the customized business form or brochure in digital format, in the practice of step (d).

5. A method as recited in claim 1 wherein step (c) is practiced to save the electronic format onto a disc, and step (d) is practiced by physically transmitting the disc.

6. A method as recited in claim 5 comprising the further steps, between steps (c) and (d), of collecting multiple customized business forms or brochures in electronic format from a plurality of different user stations and assigning identifying indicia to each; and wherein step (d) is practiced by transmitting all of the collected customized business forms or brochures together.

7. A method as recited in claim 1 wherein step (e) is practiced so as to print the high resolution graphics in color.

8. A method as recited in claim 3 wherein step (e) is practiced so as to print the high resolution graphics in color.

9. A method as recited in claim 7 wherein the text templates include price templates, and wherein step (b) is practiced to select at least one price template.

10. A method as recited in claim 9 wherein at least one of the graphic templates includes multiple and distinct graphic depictions; and wherein step (a) is practiced to select a graphics template with multiple and distinct graphic depictions, and wherein step (b) is practiced to select a price template for each of at least two different graphic depictions.

11. A method as recited in claim 1 wherein the text templates include price templates, and wherein step (b) is practiced to select at least one price template.

12. A method as recited in claim 11 wherein at least one of the graphic templates includes multiple and distinct graphic depictions; and wherein step (a) is practiced to select a graphics template with multiple and distinct graphic depictions, and wherein step (b) is practiced to select a price template for each of at least two different graphic depictions.

13. A method as recited in claim 1 wherein the customized business form or brochure to be produced has multiple pages, and wherein steps (a)–(c) are practiced for each of a plurality of the multiple pages, and the multiple pages produced are transmitted together in the practice of step (d).

14. A method as recited in claim 7 wherein the customized business form or brochure to be produced has multiple pages, and wherein steps (a)–(c) are practiced for each of a plurality of the multiple pages, and the multiple pages produced are transmitted together in the practice of step (d).

15. A method as recited in claim 14 wherein step (d) is practiced electronically over phone lines.

16. A method as recited in claim 1 comprising the further step (f) of inputting further, variable, textual data onto the screen during the practice of step (b), the further textual data saved during the practice of step (c) in electronic format as part of the customized business form or brochure.

17. A method as recited in claim 16 wherein step (f) is practiced using a keyboard.

18. A method as recited in claim 17 wherein the selecting device includes a mouse, and wherein steps (a)–(c) are practiced using the mouse.

19. A method as recited in claim 18 wherein step (d) is practiced electronically and initiated by using the mouse.

20. A method of producing customized business forms or brochures using a plurality of low resolution graphics templates in electronic form at a user station including a video monitor, selection device, and processor, said method comprising the steps of:

(a) at the user station, using the selection device to control the processor, selecting one or more low resolution graphics templates in electronic form from the plurality of templates, and displaying graphics corresponding to the graphic templates selected on the video monitor, to provide a customized business form or brochure in electronic format;

(b) using the selection device and processor electronically saving the customized business form or brochure in electronic format;

(c) electronically transmitting the saved customized business form or brochure in electronic format over phone lines to a printing installation, without transmitting a document, physical graphics, or templates from the user station; and (d) at the printing installation imaging a physical copy of the customized business form or brochure in electronic format transmitted in step (c), the customized business form or brochure in physical form having high resolution color graphics corresponding to the template graphics selected in step (a).

* * * * *